UNITED STATES PATENT OFFICE 2,673,865

STEROID ENOL ESTERS

George B. Spero and Robert H. Levin, Kalamazoo Township, Kalamazoo County, Mich., assignors to The Upjohn Company, Kalamazoo, Mich., a corporation of Michigan No Drawing. Application May 23, 1952, Serial No. 289,673

20 Claims. (Cl. 260—397.45)

The present invention relates to certain steroid enol esters and is more particularly concerned with enol esters of pregnane-3,11,20-trione and to a novel process for their production.

This application is a continuation-in-part of our co-pending application, Serial Number 253,462, filed October 26, 1951, now abandoned.

The novel compounds of the present invention are the di- and tri-enol esters of pregnane-3,11,20-trione and may be represented by the following structural formulae:

I
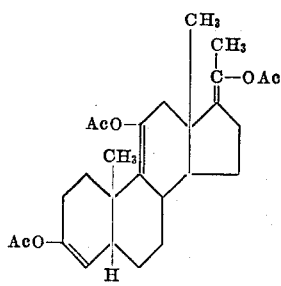

II
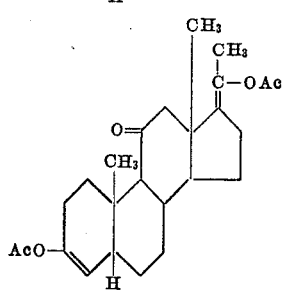

wherein Ac is the residue of a carboxylic organic acid, especially such acids containing from one to eight carbon atoms, inclusive.

The novel process of the present invention includes heating together, preferably at a temperature between about eighty and 180 degrees centigrade, pregnane-3,11,20-trione and the anhydride of an organic carboxylic acid, preferably an acid containing from one to eight carbon atoms, inclusive, in excess of the amount theoretically required to produce the desired enol ester, in the presence of an acid catalyst, and recovering from the reaction product the desired enol ester of pregnane-3,11,20-trione.

The starting compound for the process of the present invention is pregnane-3,11,20-trione, which may be represented by the following structural formula:

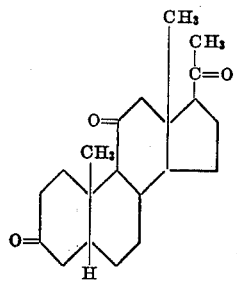

which is obtained by procedures known to the prior art [Reichstein and Fuchs, Helv. Chim. Acta, 26, 721 (1943)].

An object of the present invention is to provide a method for the enolization and esterification of the 3,11 and 20-keto groups of the starting pregnane-3,11,20-trione in a single procedure so that the corresponding acylates are formed and introduction of double bonds in the 3,9(11) and 17(20) positions is concomitantly achieved. A further object of the present invention is the provision of a process for the selective enol-esterification of the 3,20-di-keto substituents or for the enol-esterification of the 3,11,20-tri-keto substituents, whichever is desired. A still further object of the present invention is to provide the novel 3,20-diacyloxy and 3,11,20-triacyloxy enol esters of pregnane-3,11,20-trione. Other objects of the present invention will be apparent to those skilled in the art to which this invention pertains.

The novel process of the present invention has utility in the preparation of certain steroid intermediates having an oxygen atom in the 11-position of the steroid nucleus. The process of the present invention is of especial interest in the field of steroid research since the oxygenated cortical hormones are known to possess biological activity which is markedly different in effect from that of unoxygenated steroids. The novel compounds of the present invention have utility as intermediates which can be utilized in a series of syntheses leading to the preparation of biologically active 11-keto steroids, such as cortisone acetate. For example, as disclosed in our co-pending application Serial Number 255,731, filed November 9, 1951, the compounds of the present invention are treated with a peracid to give the corresponding 3(4),17(20)-dioxido compounds, which dioxido derivatives are converted, as disclosed in our copending application Serial Number 255,732, filed November 9, 1951, to 4,17α-dihydroxypregnane-3,11,20-trione. The 4,17α-dihydroxypregnane-3,11,20-trione may be brominated with bromine in chloroform to yield the corresponding 21-bromide which on reaction with potassium acetate in acetic acid yields 4,17α-dihydroxy-21-acetoxypregnane-3,11,20-trione. Removal of the 4-hydroxyl from 4,17α-dihydroxy-21-acetoxypregnane-3,11,20-trione, by dehydration, or other means, yields cortisone acetate. Alternatively, 4,17α-dihydroxypregnane-3,11,20-trione may be converted to the known 17α-hydroxy-4-pregnene-3,11,20-trione (Sarett, U. S. Patent 2,541,104), by removal of the 4-hydroxyl. Removal of the 4-hydroxyl may be accomplished by any one of several means such as, for example, direct dehydration, esterification followed by pyrolysis, or replacement of the hydroxyl by halogen followed by dehydrohalogenation with pyridine.

Novel compounds of the present invention which are of particular interest are those compounds of the above generic Formulae I and II, wherein AcO represents an enol ester of the 3,20 or 3,11,20-keto substituents with an organic acid containing up to and including eight carbon atoms, such acyloxy groups being, for example, acetoxy, propionoxy, butyroxy, valeroyloxy, hexanoyloxy, heptanoyloxy, octanoyloxy, benzolyloxy, phenylacetoxy and the like.

In carrying out the process of the present invention, the starting material, pregnane-3,11,20-trione, is admixed with an organic carboxylic acid anhydride, the amount of anhydride being in excess of the amount theoretically required to produce the desired di- or tri-enol ester of pregnane-3,11,20-trione, and in the presence of a small amount of an acid catalyst such as a sulfonic acid, e. g., para-toluenesulfonic acid, sulfosalicylic acid, or sulfuric acid, with the former being preferred.

The preferred anhydride is acetic anhydride, but other anhydrides, such as formic, propionic, butyric, valeric, isovaleric, hexanoic, heptanoic, octanoic, isooctanoic, benzoic, phenylacetic, and others are also operative. The acid anhydrides can also be substituted by groups which are non-reactive under the conditions of the process of the present invention, such as halo, alkyl, and methoxy groups, as in the case of chloroacetic, ortho-toluic and methoxybenzoic acid anhydrides. Generally, the acid anhydrides of the lower aliphatic monocarboxylic acids are preferred. The amount of esterifying agent, i. e., the acid anhydride, is preferably substantially in excess of the theoretical, i. e., three moles to one mole of the starting pregnane-3,11,20-trione, where the tri-enol esters are desired. Where the di-enol esters of pregnane-3,11,20-trione are desired, the ratio is preferably substantially in excess of the theoretical, i. e., two moles of the acid anhydride to one of the steroid starting material. The amount of acid catalyst, such as sulfuric acid, sulfonic acid, or the like, is not critical and amounts varying from a small fraction of an equivalent to several equivalents can be advantageously employed.

The reaction is conveniently carried out by heating the reaction mixture at a temperature of from about eighty to about 180 degrees centigrade. Reaction periods of between about one and 24 hours may be employed, three to eight hours being preferred. In forming th tri-enol esters, the higher temperature ranges are preferred and the acid anhydride employed is generally permitted to distill, at about 140 degrees centigrade in the case of acetic anhydride, for example, until the large excess initially present has been removed by distillation. In this manner, from about fifty to about eighty percent of the acid anhydride employed may be distilled off. Where the particular acid anhydride has a boiling point substantially above 140 degrees centigrade, the distillation may be carried out under reduced pressure, and therefore at a point below the distillation temperature of the esterification agent at normal atmospheric pressure so that undesirable side-reactions do not occur. Generally, milder reaction conditions are utilized in forming the di-enol esters and, therefore, a solvent such as toluene, benzene, xylene, or the like, which form a lower-boiling reaction mixture, is generally used. Where the anhydrides employed are solid at the preferred reaction temperature, inert organic solvents can be employed as reaction media.

Upon completion of the reaction, frequently evidenced by a change in color of the reaction solution from yellow to brown, or as indicated by titration of the distillate as in the preparation of the di-enol esters, the reaction contents may be poured over crushed ice or into ice water and the desired enol ester recovered by conventional procedure. Extraction with ether, halogenated hydrocarbons, petroleum ether, benzene, or other solvents, with ether being preferred, followed by washing with successive portions of dilute alkali metal hydroxide or other basic solution, such as dilute sodium carbonate, to remove excess acid anhydride or acid corresponding to the anhydride employed, and drying over anhydrous materials such as sodium sulfate may be advantageously employed. The organic extract may be chromatographed, preferably on an alumina (aluminum oxide) column, and the di- or tri-enol ester recovered from the eluted chromatographic fractions. Alternatively, the enol ester can be recovered directly from the organic fraction by crystallization followed by recrystallization from glacial acetic acid, acetone, alcohol, petroleum ether, or other solvent. By still other separation procedures, the organic extract can be evaporated to dryness, the residue taken up in alcohol, acetone, petroleum ether, or other solvent, and the desired enol ester obtained by crystallization. In cases where a solvent such as toluene is used, extraction may not be necessary. Instead, the mixture of reaction products can be cooled, washed with dilute alkali and water, dried and evaporated to dryness. The residue may then be crystallized from any suitable solvent. It is sometimes preferred not to crystallize the enol ester as the residue obtained after removal of the solvent is of sufficient purity to be used in subsequent reactions. Yields of both the di- and tri-enol esters of pregnane-3,11,20-trione in excess of seventy percent can be achieved using the process of the present invention, and yields of above sixty percent are consistently obtained.

The following examples are illustrative of the products and process of the present invention, but are not to be construed as limiting.

*Example 1.—3,11,20-tri-enol acetate of pregnane-3,11,20-trione*

Two and thirty-six one-hundredths grams (2.36 grams) of pregnane-3,11,20-trione was added to a mixture of 240 milliliters of acetic anhydride and 0.96 gram of para-toluenesulfonic acid and the resulting mixture heated to a temperature of 140 degrees centigrade, at which temperature distillation of the acetic anhydride began. Distillation of the acetic anhydride was then continued at a slow rate for a period of five hours, at the end of which time sixty milliliters of reaction solution remained in the reaction flask. The contents of the flask were cooled, poured into ice-water and extracted with ether. The ether extract was washed with successive 100-milliliter portions of dilute sodium carbonate solution and water, dried, and passed over a column of alumina. The column was eluted with ether and the dark brown eluate concentrated to yield 3.5 grams of the tri-enol acetate of pregnane-3,11,20-trione as an oil. The structure was confirmed by infra-red analysis.

*Example 2.—3,20-di-enol acetate of pregnane-3,11,20-trione*

A solution of 0.240 gram of sulfosalicylic acid and 14.28 grams of acetic anhydride in 140 milliliters of toluene was heated and distilled slowly through a packed column for a period of several hours. Pregnane-3,11,20-trione (3.305 grams) was then added to the reaction container and the mixture heated at reflux. A variable take-off still-head was used on the top of the column and samples of distillate collected at intervals. The course of the reaction was followed by titrating the distillate samples to determine the amount of acetic acid produced. After six hours, two equivalents of acetic acid had been produced. The reaction was stopped, cooled, and the solution washed with dilute sodium bicarbonate and water. After drying and evaporating to dryness, the residue was chromatographed over alumina. One main semi-crystalline fraction was eluted with two percent methanol in benzene and weighed 2.75 grams. Infra-red analysis was in agreement with the proposed structure of the 3,20-di-enol acetate of pregnane-3,11,20-trione.

*Example 3.—3,20-di-enol propionate of pregnane-3,11,20-trione*

Using the procedure described in Example 2, pregnane-3,11,20-trione is converted to the 3,20-di-enol propionate by reaction with propionic anhydride.

*Example 4.—3,11,20-tri-enol propionate of pregnane-3,11,20-trione*

Using the procedure described in Example 1, pregnane-3,11,20-trione is converted to the 3,11,20-tri-enol propionate by reaction with propionic anhydride.

*Example 5.—3,20-di-enol octanoylate of pregnane-3,11,20-trione*

Using the procedure described in Example 2, pregnane-3,11,20-trione is converted to the 3,20-di-enol octanoylate by reaction with octanoic acid anhydride.

*Example 6.—3,11,20-tri-enol butyrate of pregnane-3,11,20-trione*

Using the procedure described in Example 1, pregnane-3,11,20-trione is converted to the 3,11,20-tri-enol butyrate dry reaction butyric acid anhydride in toluene solvent.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of (a) 3,20-di-enol acylates and (b) 3,11,20-tri-enol acylates of pregnane-3,11,20-trione, wherein the acyloxy groups are of the formula AcO, Ac being the acyl radical of an unsubstituted monocarboxylic hydrocarbon acid containing from one to eight carbon atoms, inclusive.

2. A 3,20-di-enol acylate of pregnane-3,11,20-trione, wherein the acyloxy groups are of the formula AcO, Ac being the acyl radical of an unsubstituted monocarboxylic hydrocarbon acid containing from one to eight carbon atoms, inclusive.

3. A 3,11,20-tri-enol acylate of pregnane-3,11,20-trione, wherein the acyloxy groups are of the formula AcO, Ac being the acyl radical of an unsubstituted monocarboxylic hydrocarbon acid containing from one to eight carbon atoms, inclusive.

4. 3,20-di-enol acetate of pregnane-3,11,20-trione.

5. 3,11,20-tri-enol acetate of pregnane-3,11,20-trione.

6. 3,20-di-enol propionate of pregnane-3,11,20-trione.

7. 3,11,20-tri-enol propionate of pregnane-3,11,20-trione.

8. 3,11,20-tri-enol butyrate of pregnane-3,11,20-trione.

9. The process for the production of an enol acylate of pregnane-3,11,20-trione, which includes: heating together, at a temperature between about eighty and 180 degrees centigrade (1) pregnane-3,11,20-trione and (2) the anhydride of an organic carboxylic acid containing from one to eight carbon atoms, inclusive, in excess of the amount theoretically required to produce the desired enol-acylate, in the presence of (3) an acid catalyst for the reaction, and recovering the thus-produced enol acylate from the reaction product.

10. The process for the production of an enol acylate of pregnane-3,11,20-trione, which includes: heating together at a temperature between about eighty and 180 degrees centigrade (1) pregnane-3,11,20-trione and (2) the anhydride of an organic carboxylic acid containing from one to eight carbon atoms, inclusive, in excess of the amount theoretically required to produce the desired enol-acylate, in the presence of (3) an acid catalyst for the reaction and in (4) an organic solvent which is non-reactive under the conditions of reaction, and recovering the thus-produced enol acylate from the reaction product.

11. The process for the production of an enol acetate of pregnane-3,11,20-trione, which includes: heating together at a temperature between about eighty and 180 degrees centigrade (1) pregnane-3,11,20-trione and (2) acetic anhydride, in excess of the amount theoretically required to produce the desired enol-acetate, in the presence of (3) an acid catalyst for the reaction, and recovering the thus-produced enol-acetate from the reaction product.

12. The process for the production of an enol acetate of pregnane-3,11,20-trione, which includes: heating together at a temperature between about eighty and 180 degrees centigrade (1) pregnane-3,11,20-trione and (2) acetic anhydride, in excess of the amount theoretically required to produce the desired enol acetate, in the presence of (3) para-toluenesulfonic acid, and recovering the thus-produced enol acetate from the reaction product.

13. The process for the production of an enol acetate of pregnane-3,11,20-trione, which includes: heating together at a temperature between about eighty and 180 degrees centigrade (1) pregnane-3,11,20-trione and (2) acetic anhydride in excess of the amount theoretically required to produce the desired enol acetate, in the presence of (3) sulfosalicylic acid, and recovering the thus produced enol acetate from the reaction product.

14. The process for the production of an enol acetate of pregnane-3,11,20-trione, which includes: heating together at a temperature of about eighty to 180 degrees centrigrade (1) pregnane-3,11,20-trione and (2) acetic anhydride, in excess of the amount theoretically required to produce the desired enol acetate, in the presence of (3) sulfosalicylic acid and in (4) toluene as the solvent, and recovering the thus-produced enol acetate from the reaction product.

15. The process for the production of an enol propionate of pregnane-3,11,20-trione, which includes: heating together at a temperature between about eighty and 180 degrees centigrade (1) pregnane-3,11,20-trione and (2) propionic anhydride, in excess of the amount theoretically required to produce the desired enol propionate, in the presence of (3) para-toluenesulfonic acid, and recovering the thus-produced enol propionate from the reaction product.

16. The process for the production of a 3,20-di-enol acylate of pregnane-3,11,20-trione, which includes: heating together at a temperature between about eighty and about 180 degrees centigrade (1) pregnane-3,11,20-trione and (2) the anhydride of an organic carboxylic acid containing from one to eight carbon atoms, inclusive, in excess to the amount theoretically required to produce the desired di-enol acylate in the presence of (3) an acid catalyst for the reaction and in (4) an organic solvent which is non-reactive under the conditions of the reaction, and recovering the thus-produced di-enol acylate from the reaction product.

17. The process for the production of a 3,20-di-enol acylate of pregnane-3,11,20-trione, which includes: (a) heating together at the boiling point of the mixture (1) pregnane-3,11,20-trione and (2) the anhydride of an organic carboxylic acid containing from one to eight carbon atoms, inclusive, in excess to the amount theoretically required to produce the desired di-enol acylate in the presence of (3) an acid catalyst for the reaction and in (4) an organic solvent which is non-reactive under the conditions of the reaction, and (b) allowing the reaction mixture to slowly distill, and (c) stopping the reaction when two equivalents of the acid anhydride have reacted, as indicated by titration of the distillate to determine the amount of acid formed in the reaction and removed with the distillate, and (d) recovering the thus-produced di-enol acylate of pregnane-3,11,20-trione.

18. The process for the production of the 3,20-di-enol acetate of pregnane-3,11,20-trione, which includes: (a) heating together at the boiling point of the mixture (1) pregnane-3,11,20-trione and (2) at least two equivalents of acetic anhydride, in the presence of (3) sulfosalicylic acid and in (4) toluene as the solvent, and (b) allowing the reaction mixture to slowly distill, and (c) stopping the reaction when two equivalents of acetic anhydride have reacted, as indicated by titration of the distillate to determine the amount of acetic acid formed in the reaction and removed with the distillate, and (d) recovering the thus-produced di-enol acetate of pregnane-3,11,20-trione.

19. The process for the production of a 3,11,20-tri-enol acylate of pregnane-3,11,20-trione, which includes: heating together, at a temperature between about eighty and about 180 degrees centigrade (1) pregnane-3,11,20-trione and (2) an anhydride of an organic carboxylic acid containing from one to eight carbon atoms, inclusive, in excess to the amount theoretically required to produce the desired enol acylate, in the presence of (3) an acid catalyst for the reaction, and recovering the thus-produced 3,11,20-tri-enol acylate from the reaction product.

20. The process for the production of the 3,11,20-tri-enol acetate of pregnane-3,11,20-trione, which includes: heating together at a temperature of about eighty and 180 degrees centigrade (1) pregnane-3,11,20-trione and (2) at least three equivalents of acetic anhydride, in the presence of (3) para-toluene-sulfonic acid, and recovering the thus-produced 3,11,20-tri-enol acetate of pregnane-3,11,20-trione.

GEORGE B. SPERO.
ROBERT H. LEVIN.

References Cited in the file of this patent

Marshall et al.: Jour. Am. Chem. Soc., 70, 1837–1839 (1948).

Kritchevsky et al.: Jour. Biol. Chem., 179, 507–508 (1949).